(12) United States Patent
Watanabe et al.

(10) Patent No.: US 8,663,865 B2
(45) Date of Patent: Mar. 4, 2014

(54) METHOD OF MANUFACTURING FUEL CELL, FUEL CELL MANUFACTURING DEVICE, AND FUEL CELL

(75) Inventors: Kazuhiro Watanabe, Toyota (JP); Takuji Nagano, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 232 days.

(21) Appl. No.: 13/258,224

(22) PCT Filed: Nov. 30, 2010

(86) PCT No.: PCT/JP2010/006961
§ 371 (c)(1),
(2), (4) Date: Sep. 21, 2011

(87) PCT Pub. No.: WO2012/073271
PCT Pub. Date: Jun. 7, 2012

(65) Prior Publication Data
US 2012/0264032 A1 Oct. 18, 2012

(51) Int. Cl.
*H01M 2/20* (2006.01)
*H01M 8/00* (2006.01)
*H01M 8/24* (2006.01)

(52) U.S. Cl.
USPC ........... 429/467; 429/470; 429/471; 429/535; 429/452

(58) Field of Classification Search
USPC ............................ 429/47, 470, 471, 535, 452
See application file for complete search history.

(56) References Cited

FOREIGN PATENT DOCUMENTS

| JP | 63-037573 A | 2/1988 |
|---|---|---|
| JP | 10-189025 A | 7/1998 |
| JP | 2000-087277 A | 3/2000 |
| JP | 2002-298901 A | 10/2002 |
| JP | 2005-158615 A | 6/2005 |
| JP | 2006-108009 A | 4/2006 |
| JP | 2008-059875 A | 3/2008 |
| JP | 2008-234920 A | 10/2008 |
| JP | 2009-170169 A | 7/2009 |
| JP | 2009-266760 A | 11/2009 |
| JP | 2010-212139 A | 9/2010 |

OTHER PUBLICATIONS

International Search Report issued Feb. 1, 2011 in PCT/JP2010/006961.

*Primary Examiner* — Helen O Conley
(74) *Attorney, Agent, or Firm* — Kenyon & Kenyon LLP

(57) ABSTRACT

A method of manufacturing a fuel cell includes the steps of: (a) providing an extendable stacking reference member structured to extend and contract in a stacking direction; (b) arranging the stacking reference member in an extended setting via a first opening, such that one end of the stacking reference member is located inside a casing body and the other end of the stacking reference member is located outside the casing body; (c) after the step (b), mounting a plurality of cells of a cell laminate on the stacking reference member in a direction from inside to outside of the casing body; (d) contracting the stacking reference member and compressing the mounted cell laminate in the stacking direction, so as to locate the stacking reference member and the cell laminate inside the casing body of the fuel cell; and (e) after the step (d), attaching an end wall member to a first wall member to close the first opening and maintaining the cell laminate under a load in the stacking direction.

14 Claims, 15 Drawing Sheets

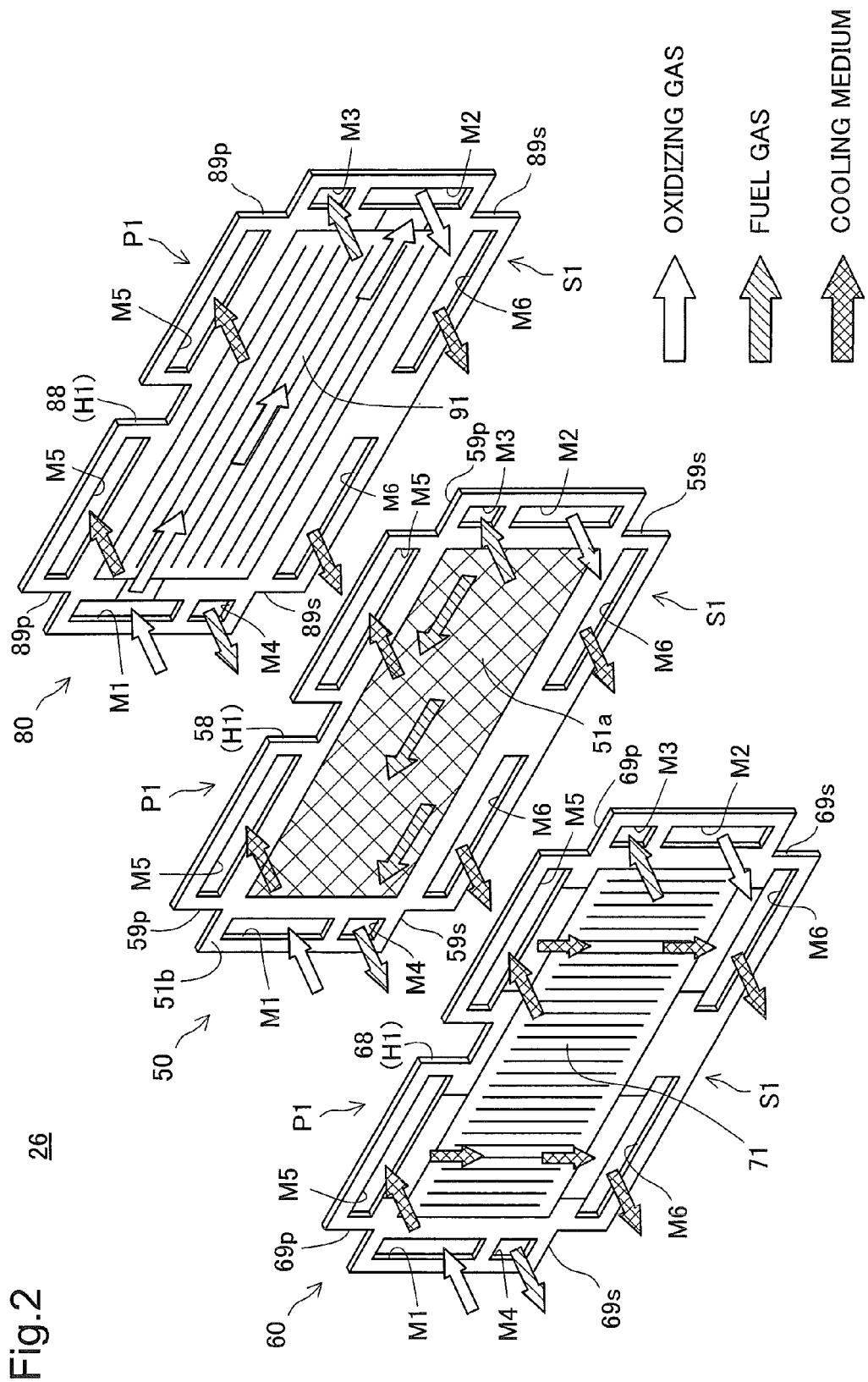

PREPARATION STEP AND POSITIONING STEP

POSITIONING STEP AND CELL STACKING STEP

CELL STACKING STEP

Fig.6A CELL STACKING STEP AND CELL COMPRESSING STEP
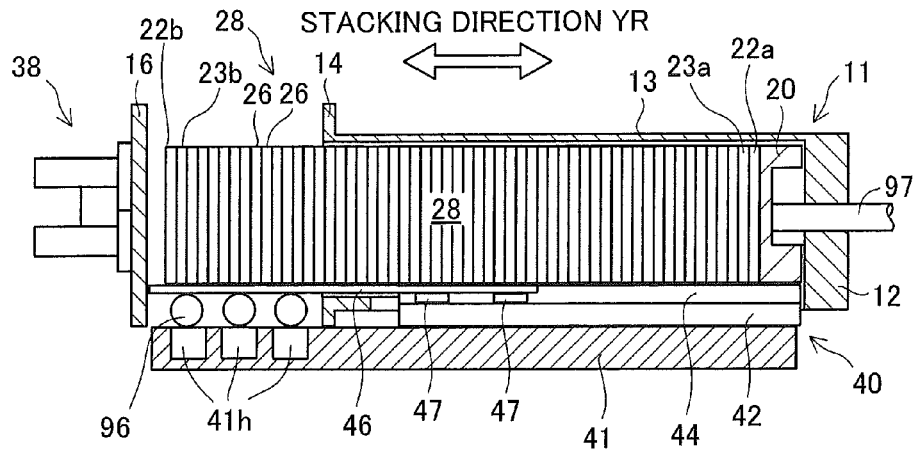
Fig.6B CELL COMPRESSING STEP
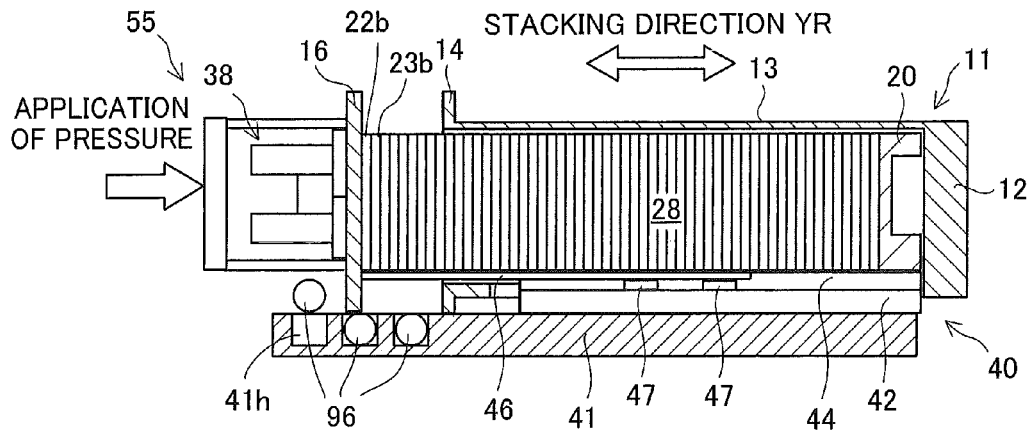
Fig.6C CELL COMPRESSING STEP
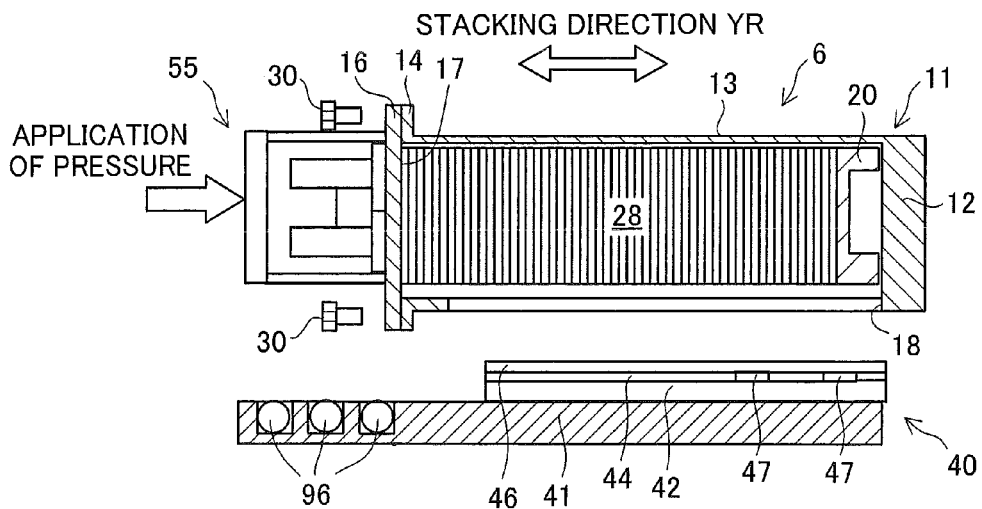

Fig. 7A  REINFORCING STEP
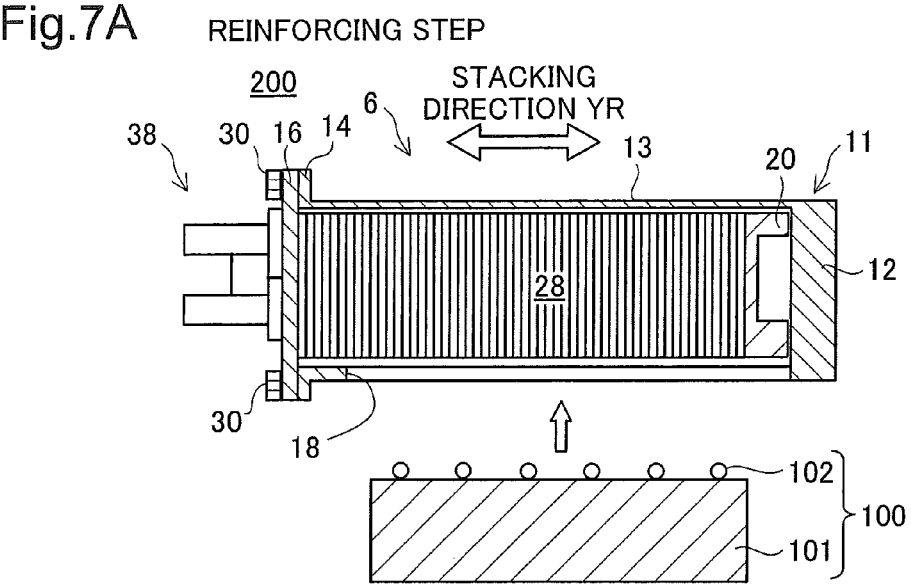
Fig. 7B  REINFORCING STEP
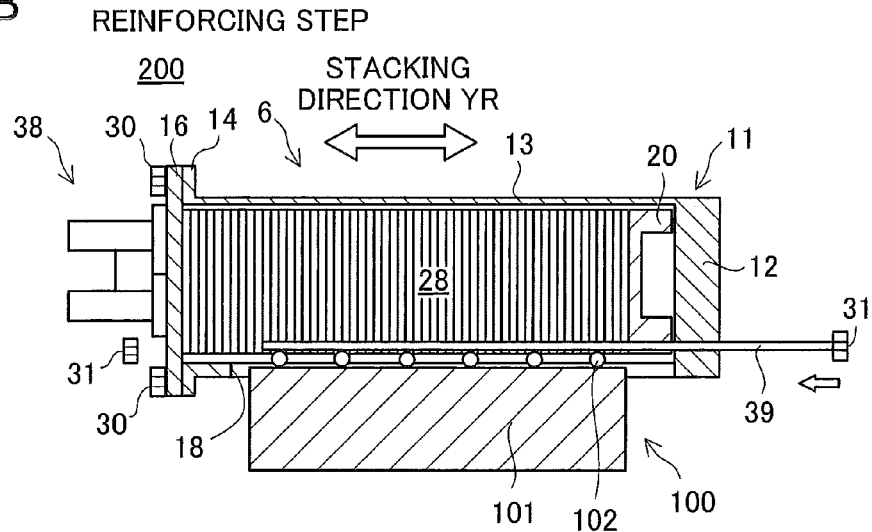
Fig. 7C  REINFORCING STEP
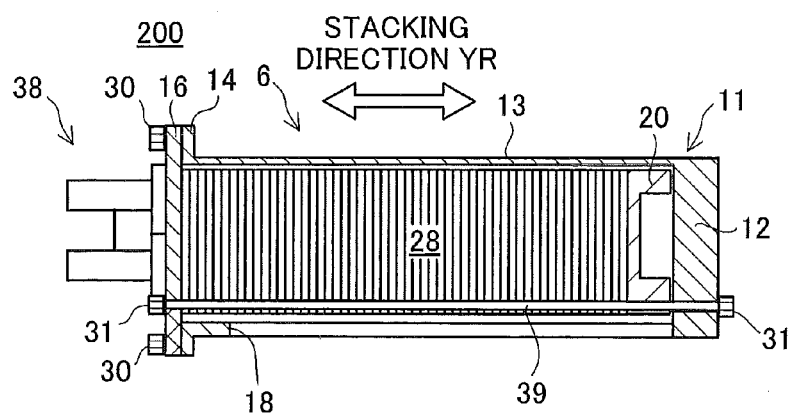

Fig.8A  COMPRESSION ADJUSTMENT STEP
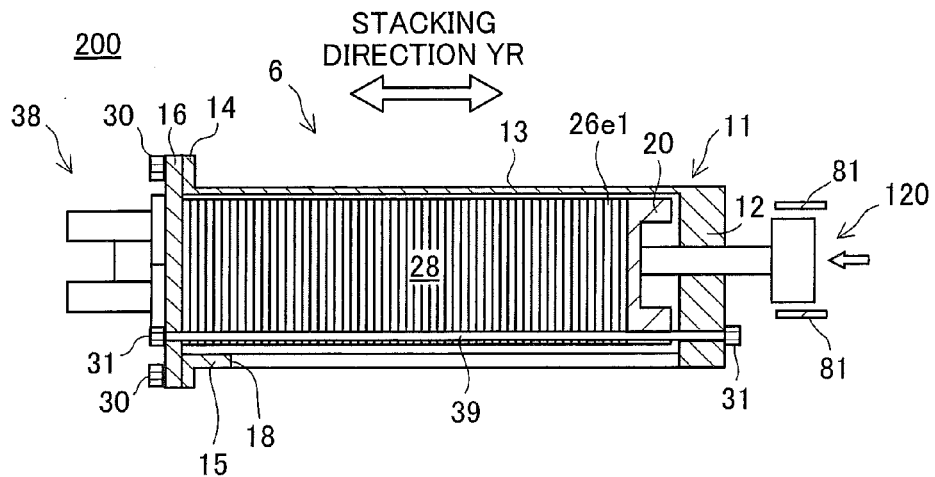
Fig.8B  COMPRESSION ADJUSTMENT STEP
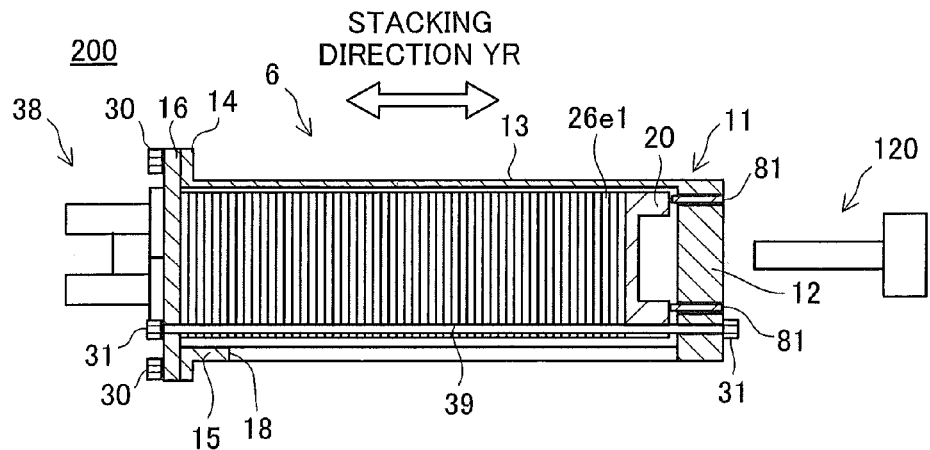
Fig.8C  OPENING SEALING STEP
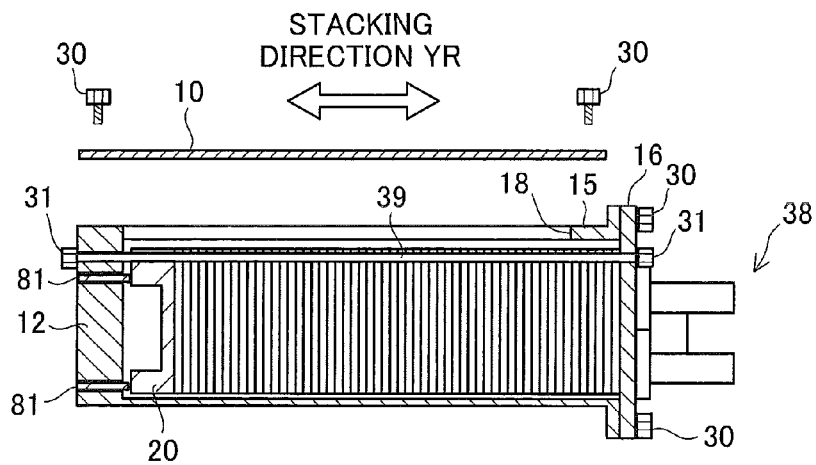

X-X SECTIONAL VIEW

X-X SECTIONAL VIEW

METHOD OF MANUFACTURING FUEL CELL, FUEL CELL MANUFACTURING DEVICE, AND FUEL CELL

This is a 371 national phase application of PCT/JP2010/006961 filed 30 Nov. 2010, the contents of which are incorporated herein by reference.

TECHNICAL FIELD

The present invention relates to a method of manufacturing a fuel cell including a cell laminate and a casing in which the cell laminate is contained, a fuel cell manufacturing device, and a fuel cell.

BACKGROUND ART

One fuel cell-related technique conventionally known in the art locates a cell laminate, which is obtained by stacking a plurality of cells one upon another, inside a box-shaped casing (see, for example, patent literatures 1 and 2). More specifically, the cell laminate in a compressed state in a stacking direction is contained in the casing. Each of the cells has a membrane electrode assembly including a pair of electrodes arranged on either side of an electrolyte membrane, and a pair of separators arranged on either side of the membrane electrode assembly.

CITATION LIST

Patent Literature
Patent Literature 1: JP-A-2006-108009
Patent Literature 2: JP-A-H10-189025
Patent Literature 3: JP-A-2002-298901
Patent Literature 4: JP-A-2008-059875
Patent Literature 5: JP-A-2009-170169
Patent Literature 6: JP-A-2009-266760
Patent Literature 7: JP-A-2005-158615

DISCLOSURE OF THE INVENTION

The cell laminate contained inside the casing may be compressed by application of a pressure in the stacking direction. The overall length of the cell laminate in the compressed state is made shorter than the overall length of the cell laminate in an uncompressed state. There may accordingly be a relatively large vacant space without the cell laminate inside the casing.

By taking into account at least part of the issue discussed above, there is a requirement for providing a technique to achieve size reduction of a fuel cell including a cell laminate and a casing in which the cell laminate is contained.

In order to address at least part of the requirement described above, the present invention provides various embodiments and applications described below.

[First Aspect]

A method of manufacturing a fuel cell comprising: a cell laminate obtained by stacking a plurality of cells, and a casing in which the cell laminate is contained in a compressed state in a stacking direction, wherein the casing includes a casing body having a first wall member that has a first opening and is arranged to intersect with the stacking direction and a second wall member that is arranged to face the first wall member, and an end wall member attached to the first wall member to close the first opening, the method of manufacturing the fuel cell comprising the steps of:

(a) providing an extendable stacking reference member structured to extend and contract in the stacking direction;

(b) arranging the stacking reference member in an extended setting via the first opening, such that one end of the stacking reference member is located inside the casing body and the other end of the stacking reference member is located outside the casing body;

(c) after the step (b), mounting the plurality of cells of the cell laminate on the stacking reference member from inside to outside of the casing body;

(d) contracting the stacking reference member and compressing the mounted cell laminate in the stacking direction, so as to locate the stacking reference member and the cell laminate inside the casing body; and (e) after the step (d), attaching the end wall member to the first wall member to close the first opening and maintaining the cell laminate under a load in the stacking direction.

The manufacturing method according to the first aspect enables the cells in the uncompressed state, which are not fully receivable inside the casing body, to be mounted on the extendable stacking reference member. This arrangement does not require a large casing having sufficient dimensions to accommodate the cell laminate in the uncompressed state, thus achieving size reduction of the fuel cell.

[Second Aspect]

The method of manufacturing the fuel cell in accordance with the first aspect, wherein the casing body further includes a third wall member that is arranged to intersect with both the first wall member and the second wall member and has a second opening, and the step (b) includes locating the stacking reference member on a side of the third wall member, the method of manufacturing the fuel cell further comprising the step of:

(f) after the step (d), removing the stacking reference member via the second opening out of the casing.

In the state where the stacking reference member is not removable via the first opening, the manufacturing method of the second aspect enables the stacking reference member to be removed via the second opening. This arrangement preferably reduces the overall weight of the fuel cell.

[Third Aspect]

The method of manufacturing the fuel cell in accordance with either one of the first and second aspects, further comprising the step of:

(g) after the step (e), attaching a rod member, which is extended from the end wall member to the second wall member, to both the end wall member and the second wall member.

The manufacturing method of the third aspect mounts the rod member on the casing, so as to reduce the decrease in strength of the casing.

[Fourth Aspect]

The method of manufacturing the fuel cell in accordance with the third aspect, wherein the cell laminate has a first groove formed on a mounting side of the cell laminate, the mounting side being mounted directly on the stacking reference member, and the step (g) includes locating part of the rod member inside the first groove.

The manufacturing method of the fourth aspect effectively uses the space formed inside of the casing to mount the rod member on the casing.

[Fifth Aspect]

The method of manufacturing the fuel cell in accordance with either one of the first and second aspects, wherein the casing body further includes a projection that is protruded inward the casing and is extended in the stacking direction, the cell laminate has a first groove formed on a mounting side of the cell laminate, the mounting side being mounted directly on the stacking reference member, and the step (c) includes mounting the plurality of cells on the mounting reference member, such that the projection is located inside the first groove.

The manufacturing method of the fifth aspect locates the projection inside the first groove. This arrangement effectively prevents each of the plurality of cells of the assembled cell laminate located inside the casing from being misaligned in a direction perpendicular to the stacking direction.

[Sixth Aspect]

The method of manufacturing the fuel cell in accordance with any one of the first aspect through the fifth aspect, further comprising the step of:

(h) after the step (e), moving at least one of end cells located on either end of the cell laminate in the stacking direction, in order to adjust a compression degree of the cell laminate.

The manufacturing method of the sixth aspect enables adjustment of the load in the stacking direction applied to the cell laminate, after attachment of the end wall member to the first wall member. This arrangement assures production of the fuel cell having the cell laminate under an intended load.

[Seventh Aspect]

The method of manufacturing the fuel cell in accordance with any one of the first aspect through the sixth aspect, wherein the step (d) applies a pressure onto the stacking reference member and the cell laminate via the end wall member in a direction from outside of the casing body toward the second wall member.

The manufacturing method of the seventh aspect uses the end wall member as one component of the casing to perform the step (d). This arrangement enables the fuel cell to be manufactured efficiently.

[Eighth Aspect]

The method of manufacturing the fuel cell in accordance with the second aspect, wherein the step (b) includes the steps of:

(b1) locating the stacking reference member inside the casing body via the second opening; and (b2) after the step (b1), extending the stacking reference member to locate the other end of the stacking reference member outside the casing body.

The manufacturing method of the eighth aspect can locate the stacking reference member at a predetermined position relative to the casing body by using the second opening.

[Ninth Aspect]

The method of manufacturing the fuel cell in accordance with either one of the second aspect and the eighth aspect, wherein the step (f) includes, after removal of the stacking reference member, covering the second opening with a liquid-impermeable but gas-permeable film.

The manufacturing method of the ninth aspect effectively prevents external invasion of any liquid, such as rainwater, while enabling transmission of gases, such as a fuel gas.

[Tenth Aspect]

A fuel cell manufacturing device for a fuel cell comprising: a cell laminate obtained by stacking a plurality of cells, and a casing in which the cell laminate is contained in a compressed state in a stacking direction, the fuel cell manufacturing device comprising:

an extendable stacking reference member structured to extend and contract in the stacking direction, wherein the cell laminate is mounted on the stacking reference member.

The fuel cell manufacturing device according to the tenth enables the cells in the uncompressed state, which are not fully receivable inside the casing body, to be mounted on the extendable stacking reference member. This arrangement does not require a large casing having sufficient dimensions to accommodate the cell laminate in the uncompressed state, thus achieving size reduction of the fuel cell.

[Eleventh Aspect]

The fuel cell manufacturing device in accordance with the tenth aspect, further comprising:

an adjustment mechanism configured to move in the stacking direction at least one of end cells located on either end of the cell laminate contained inside the casing, in order to adjust a compression degree of the cell laminate.

The fuel cell manufacturing device of the eleventh aspect enables adjustment of the load in the stacking direction applied to the cell laminate, after locating the cell laminate inside the casing. This arrangement assures application of an intended load onto the cell laminate.

[Twelfth Aspect]

The fuel cell manufacturing device in accordance with either one of the tenth aspect and eleventh aspect, wherein the stacking reference member includes:

a first reference member located inside the casing and structured to extend and contract in the stacking direction; and a second reference member arranged to be movable in the stacking direction relative to the first reference member and thereby to be partially located outside of the casing.

The fuel cell manufacturing device of the twelfth aspect moves the second reference member relative to the first reference member, so as to readily adjust the length of the stacking reference member.

[Thirteenth Aspect]

The fuel cell manufacturing device in accordance with any one of the tenth aspect through the twelfth aspect, wherein the stacking reference member has a length in a contracted setting that is shorter than a stacking length which is an internal length of the casing in the stacking direction, while having a length in an extended setting that is longer than the stacking length.

The fuel cell manufacturing device of the thirteenth aspect enables the cell laminate in the uncompressed state having a length that is longer than the stacking length of the casing to be mounted on the stacking reference member.

[Fourteenth Aspect]

The fuel cell manufacturing device in accordance with any one of the tenth aspect through thirteenth aspect, wherein the stacking reference member has a mounting face arranged in one identical plane, wherein the cell laminate is mounted on the mounting face.

The fuel cell manufacturing device of the fourteenth aspect effectively prevents the potential misalignment of each of the plurality of cells mounted on the stacking reference member.

[Fifteenth Aspect]

A fuel cell, comprising:

a cell laminate obtained by stacking a plurality of cells one upon another;

a casing in which the cell laminate is contained in a compressed state in a stacking direction; and an extendable stacking reference member structured to extend and contract in the stacking direction of the cell laminate and arranged to be located inside the casing in a contracted setting, wherein the stacking reference member in an extended setting has one end located inside the casing and the other end located outside the casing, and the cell laminate to be contained in the casing is mounted on the stacking reference member.

The fuel cell according to the fifteenth aspect has the extendable stacking reference member structured to extend and contract in the stacking direction. The plurality of cells of the cell laminate in the uncompressed state, which are not fully receivable inside the casing body, can thus be mounted on the extendable stacking reference member in the manufacturing process. This arrangement does not require a large casing having sufficient dimensions to accommodate the cell laminate in the uncompressed state, thus achieving size reduction of the fuel cell.

[Sixteenth Aspect]

The fuel cell in accordance with the fifteenth aspect, wherein the stacking reference member has a length in the extended setting that is longer than an internal length of the casing in the stacking direction.

In the fuel cell of the sixteenth aspect, even when the length of the cell laminate in the uncompressed state is longer than the internal length of the casing in the stacking direction, the cell laminate in the uncompressed state can be mounted on the stacking reference member in the extended setting.

The present invention may be actualized by diversity of other applications, in addition to the method of manufacturing the fuel cell, the fuel cell manufacturing device, and the fuel cell discussed above, for example, a vehicle (moving body) equipped with the fuel cell and facilities including the fuel cell.

BRIEF DESCRIPTION OF THE DRAWINGS

FIG. 2 is an exploded perspective view of the unit cell 26;
FIG. 6 is a second explanatory diagram of the method of manufacturing the fuel cell 1;
FIG. 7 is a third explanatory diagram of the method of manufacturing the fuel cell 1;
FIG. 8 is a fourth explanatory diagram of the method of manufacturing the fuel cell 1;
FIG. 11 is an explanatory diagram of a typical flow of a method of manufacturing a fuel cell 1a.

DESCRIPTION OF EMBODIMENTS

Some embodiments of the present invention are described below in the following sequence:

A-E: Embodiments
F: Modifications

A. First Embodiment

A-1. Structure of Fuel Cell

Figure 1:
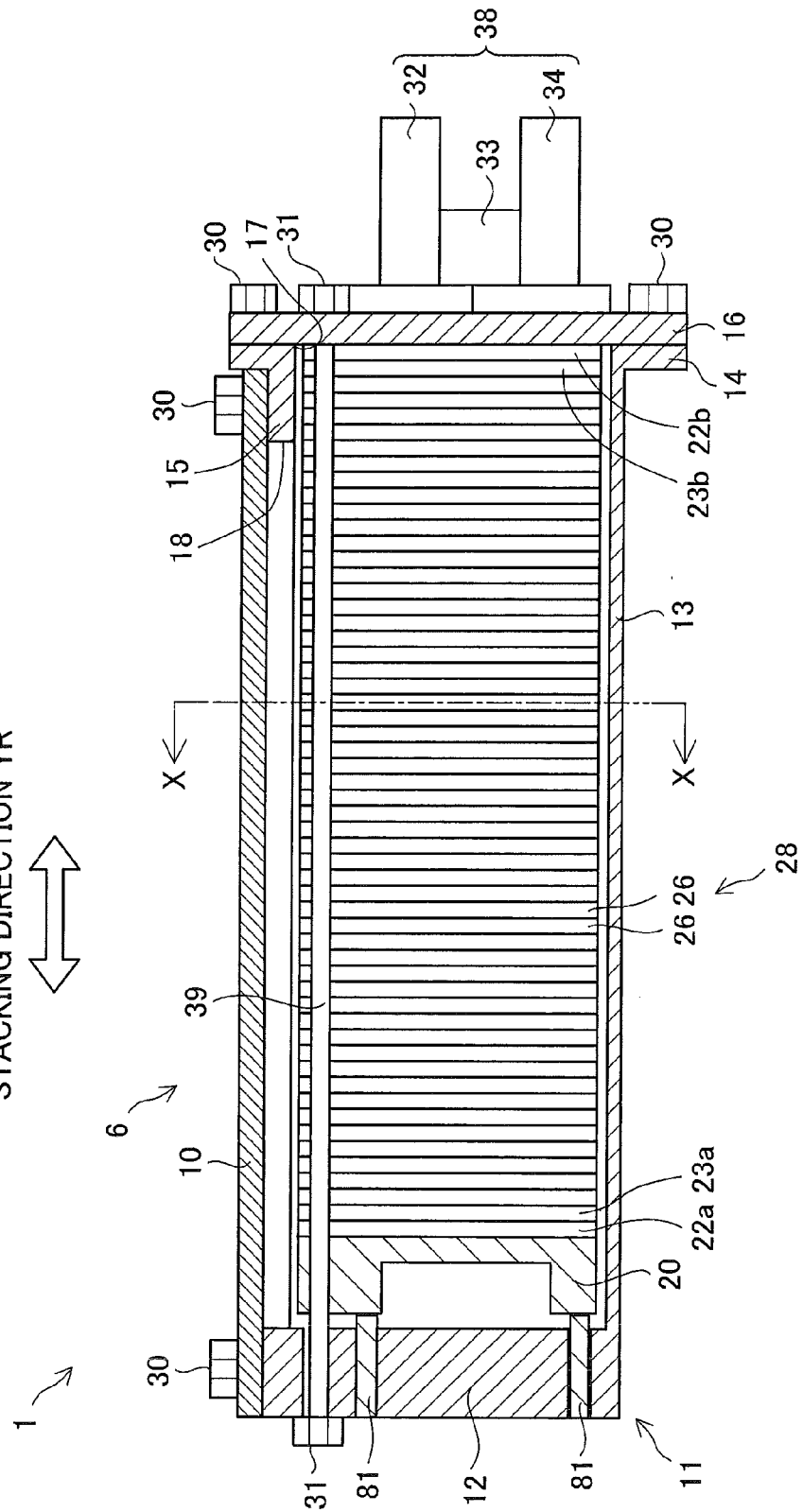
FIG. 1 is an explanatory diagram of a fuel cell 1 according to a first embodiment.

FIG. 1 is an explanatory diagram of a fuel cell 1 according to a first embodiment. Specifically, FIG. 1 shows a sectional view of the fuel cell 1 taken along a preset plane parallel to the sheet plane. The fuel cell 1 includes a cell laminate 28 provided by stacking a plurality of unit cells 26 one upon another, a pair of terminal plates 23a and 23b respectively located on either side of the cell laminate 28, a pair of insulators 22a and 22b respectively located outside of the pair of terminal plates 23a and 23b, a pressure plate 20 located outside of the insulator 22a, and a casing 6 in which the cell laminate 28 is contained in a compressed state. Manifolds (not shown) are provided in a stacking direction YR inside the cell laminate 28 to make flows of reaction gases (e.g., a fuel gas and an oxidizing gas) and a cooling medium therethrough and to supply the reaction gases and the cooling medium to the respective unit cells 26.

The fuel cell 1 is a polymer electrolyte fuel cell configured to receive supplies of hydrogen and oxygen and generate electric power. The fuel cell 1 is mounted on a moving body, for example, a vehicle, and is used as a power source of the moving body. The fuel cell 1 may also be usable as a stationary power source.

The casing 6 includes a cuboid casing body 11 having a first opening 17 formed in a first wall member 14, and a rectangular end wall member 16 attached to the casing body 11 by means of bolts 30 to close the opening 17. The casing 6 may be composed of steel or another suitable metal. The inner wall surface of the casing body 11 is covered with an insulating material (e.g., a resin material) (not shown). The first wall member 14 is arranged perpendicular to the stacking direction YR. The casing body 11 further includes a second wall member 12 facing the first wall member 14, a third wall member 15 arranged perpendicular to the first wall member 14 and the second wall member 12, a fourth wall member 13 facing the third wall member 15, and a fifth wall member and a sixth wall member (not shown) arranged parallel to the stacking direction YR and perpendicular to the third wall member 15 and the fourth wall member 13. A single second opening 18 is formed over the whole area of the third wall member 15. Auxiliary machinery 38 is mounted on the end wall member 16. The auxiliary machinery 38 includes, for example, pipings 32 and 34 provided to externally supply the reaction gases into the manifolds, and a pump 33 provided to pump the fuel gas (hydrogen).

The fuel cell 1 further includes a metal rod member 39 arranged to be extended in the stacking direction YR and pass through the inside of the casing 6, and a rectangular cover member 10 attached to the third wall member 15 by means of bolts 30 to close the opening 18. The rod member 39 is fastened to the second wall member 12 and the end wall member 16 by means of nuts 31.

The cell laminate 28 is held between the pressure plate 20 and the end wall member 16 and is maintained under a preset load inside the casing 6. More specifically, the cell laminate 28 is provided in a compressed manner in the stacking direction YR inside the casing 6. The pressure plate 20 is pressed in a direction toward the end wall member 16 by means of eight screws 81 (only two screws are shown in the drawing) inserted through the second wall member 12. The pressure plate 20 and the end wall member 16 accordingly serve as component parts (end plates) of a fuel cell stack including the cell laminate 28.

FIG. 2 is an exploded perspective view of the unit cell 26. The unit cell 26 includes a seal-integrated type membrane electrode assembly 50 and a first separator 60 and a second separator 80 located on either side of the seal-integrated type membrane electrode assembly 50. The seal-integrated type membrane electrode assembly 50 includes a membrane electrode assembly 51a and seal gasket 51b arranged around the circumference of the membrane electrode assembly 51a. The membrane electrode assembly 51a includes a solid polymer electrolyte membrane having proton conductivity, and an anode and a cathode located on either side of the solid polymer electrolyte membrane. Each of the anode and the cathode has a gas diffusion layer composed of, for example, carbon paper, and a catalyst layer having platinum-supported or another catalyst-supported carbon particles applied on each face of the solid polymer electrolyte membrane. The seal gasket 51b is provided by injecting molding of a synthetic resin material or another suitable material around the circumference of the membrane electrode assembly 51a.

The first separator 60 and the second separator 80 are plate members composed of a gas-impermeable conductive material, for example, dense carbon obtained by compacting carbon to have gas impermeability, sintered carbon, or a metal material like stainless steel.

A plurality of through holes are formed in the circumferential areas of the seal-integrated type membrane electrode assembly 50 and the first and the second separators 60 and 80. In the state where the respective unit cells 26 are stacked one upon another, the through holes form manifolds M1 through M6 to make the flows of the reaction gases (fuel gas and oxidizing gas) and the cooling medium (for example, water) in the stacking direction.

More specifically, the externally supplied oxidizing gas flows through the manifold M1, whereas the oxidizing gas transmitted through the membrane electrode assembly 51a (cathode off-gas) flows through the manifold M2. The externally supplied fuel gas flows through the manifold M3, whereas the fuel gas transmitted through the membrane electrode assembly 51a (anode off-gas) flows through the manifold M4. The externally supplied cooling medium flows through the manifold M5, whereas the cooling medium after being subjected to cooling flows through the manifold M6.

One face of the first separator 60 facing the membrane electrode assembly 51a has grooves (not shown), into which the fuel gas passing through the manifold M3 flows. The other face of the first separator 60 arranged on the opposite side to the membrane electrode assembly 51a have grooves 71, into which the cooling medium passing through the manifold M5 flows.

One face of the second separator 80 facing the membrane electrode assembly 51a has grooves 91, into which the oxidizing gas passing through the manifold M1 flows. The other face of the second separator 80 arranged on the opposite side to the membrane electrode assembly 51a have grooves (not shown), into which the cooling medium passing through the manifold M5 flows.

The respective components 50, 60, and 80 of the unit cell 26 are rectangular flat plate members respectively having cutouts 59p and 59s, 69p and 69s, and 89p and 89s on their four corners. The respective components 50, 60, and 80 of the unit cell 26 also have cutouts 58, 68, and 88 formed on approximate centers of respective specific sides of their circumferences, which are expected to be mounted directly on stacking reference members (discussed later) (hereafter referred to as "mounting side P1"). In the state where the unit cells 26 are stacked one upon another to form the cell laminate 28, the cutouts 58, 68, and 88 are aligned to form a groove H1 extended in the stacking direction YR in the cell laminate 28. None of the components 50, 60, and 80 has a cutout on approximate center of an opposite side Si facing the mounting side P1.

A-2. Fuel Cell Manufacturing Device and Method of Manufacturing Fuel Cell

Figure 3A:
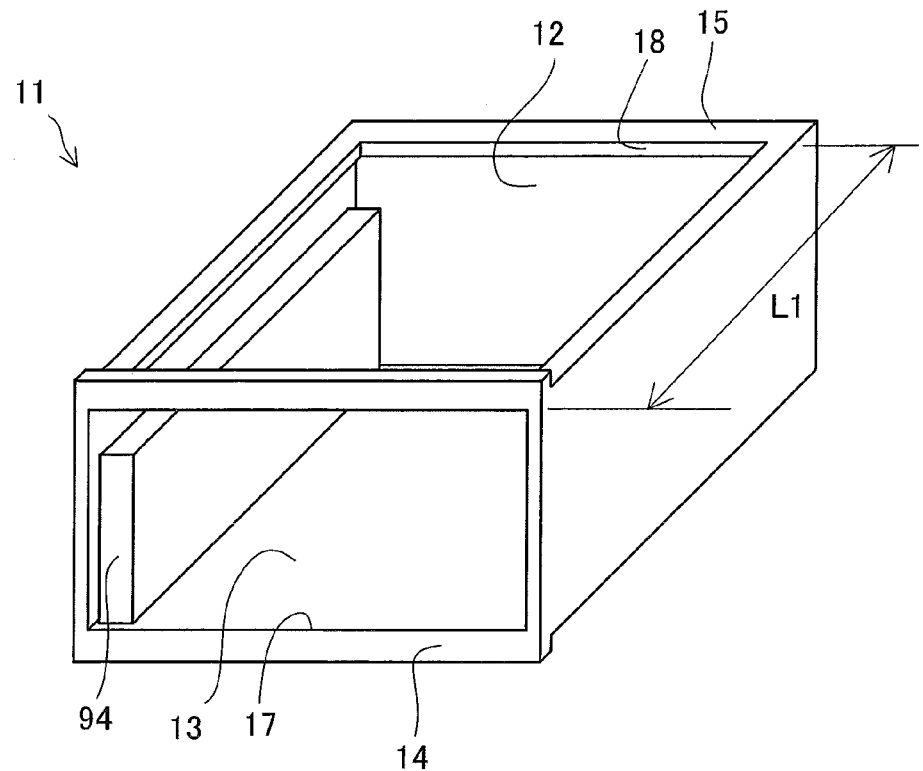
FIG. 3 is an explanatory diagram of a fuel cell manufacturing device for the fuel cell 1.
Figure 3B:
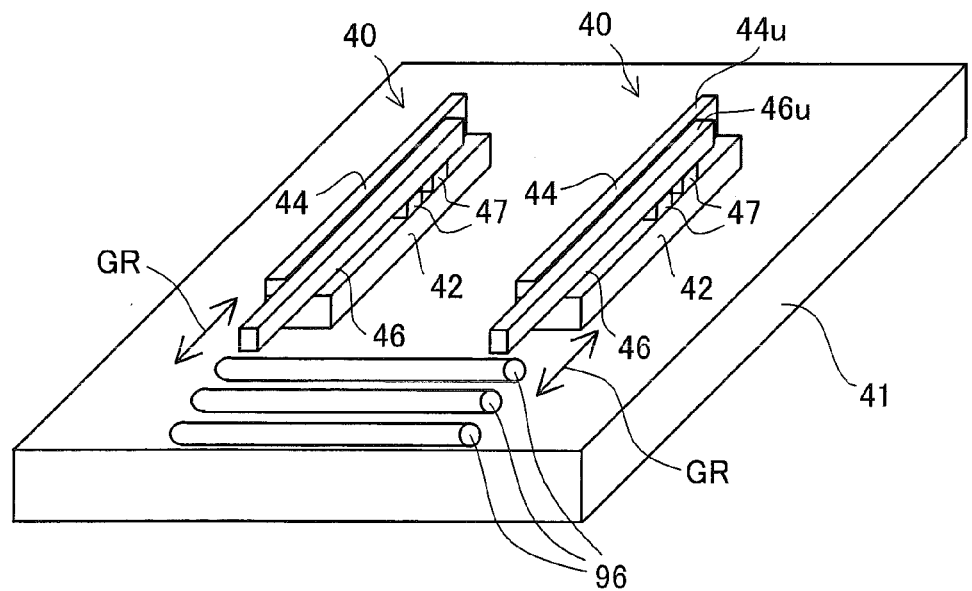

FIG. 3 is an explanatory diagram of a fuel cell manufacturing device 150 for the fuel cell 1. FIG. 3A schematically shows the appearance of the casing body 11 shown in FIG. 1. FIG. 3B schematically shows the appearance of various components included in the fuel cell manufacturing device 150 of the fuel cell 1. Referring to FIG. 3A, a monitor board 94 used for monitoring the cell voltage of the cell laminate 28 is installed in the casing body 11, before the cell laminate 28 is set inside the casing body 11.

Referring to FIG. 3B, the fuel cell manufacturing device 150 includes two stacking reference members 40 and a bottom plate 41 having the stacking reference members 40 located thereon. Each of the stacking reference members 40 has a stationary guide 44 as a first reference part, a movable guide 46 as a second reference part, a base plate 42 having the stationary guide 44 and the movable guide 46 supported thereon, and slide guides 47 provided for the smooth motion of the movable guide 46. The movable guide 46 moves along the length or in the direction of an arrow GR relative to the stationary guide 44. Moving the movable guide 46 varies the overall length of the stacking reference member 40. More specifically, the overall length of the stacking reference member 40 can be varied arbitrarily by moving the movable guide 46. In this embodiment, in the shortest setting of the stacking reference member 40 (i.e., in the contracted setting), the overall length of the stacking reference member 40 is shorter than a length L1 of an inner dimension of the casing body 11 in the direction between the mutually facing first wall member 14 and second wall member 12 ("stacking length L1"). In the longest setting of the stacking reference member 40 (i.e., in the extended setting), the overall length of the stacking reference member 40 is longer than the stacking length L1. The fuel cell manufacturing device 150 also has rollers 96 located on the bottom plate 41 to rotate while supporting the movable guides 46 in the extended setting of the stacking reference members 40. The stationary guide 44 and the movable guide 46 are arranged such that respective upper faces 44u and 46u lie in the same plane.

A-2. Method of Manufacturing Fuel Cell

Figure 4:
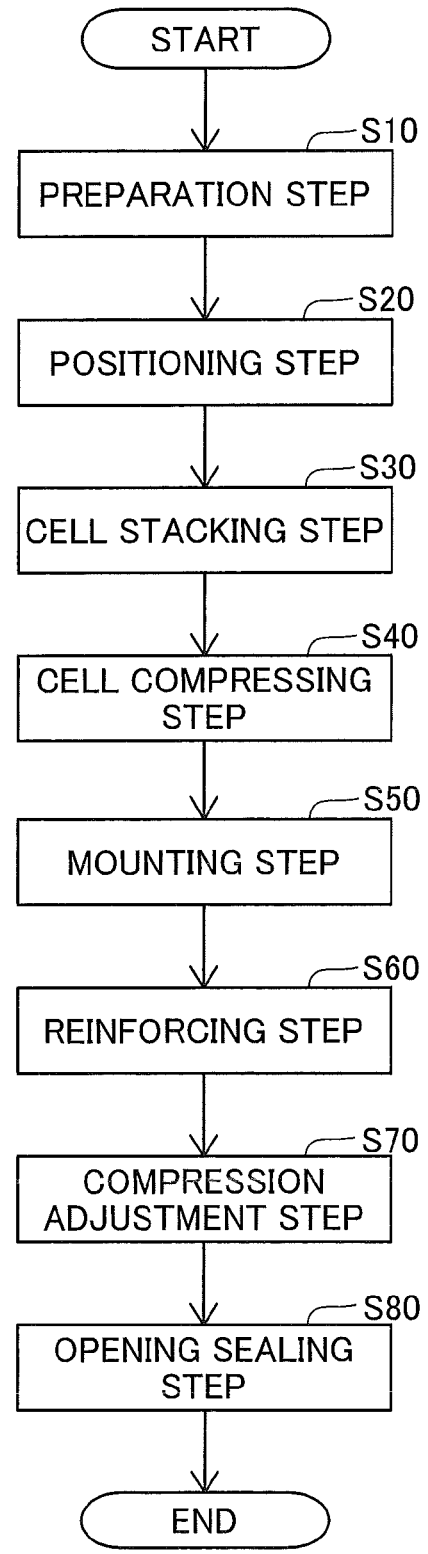
FIG. 4 is an explanatory diagram of a typical flow of a method of manufacturing the fuel cell 1.

The method of manufacturing the fuel cell 1 is described below. FIG. 4 is an explanatory diagram of a typical flow of the method of manufacturing the fuel cell 1. The fuel cell 1 is manufactured through a preparation step S10 of providing the stacking reference members 40 to an opening sealing step S80.

Figure 5A:
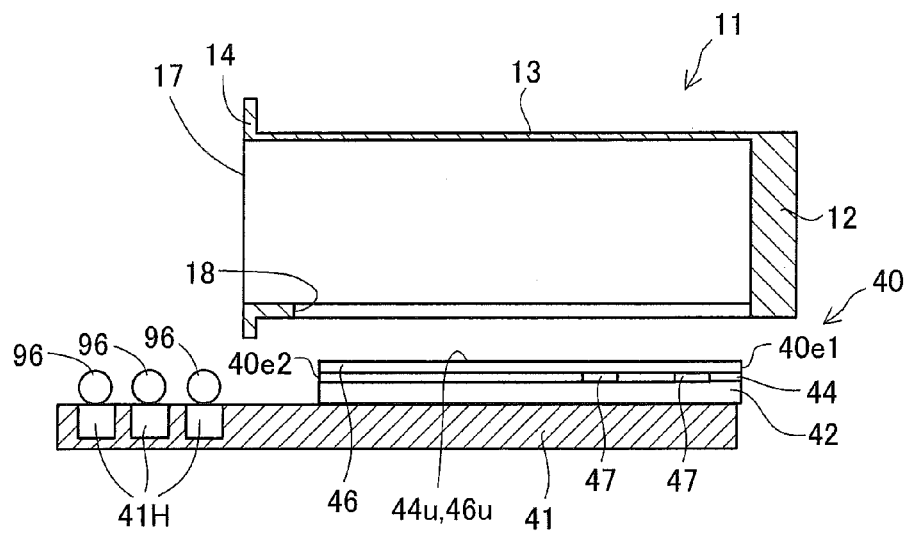
FIG. 5 is a first explanatory diagram of the method of manufacturing the fuel cell 1.

The respective steps are discussed below in detail with reference to FIGS. 5 through 9. FIG. 5 is a first explanatory diagram of the method of manufacturing the fuel cell 1. The procedure mounts the provided stacking reference members 40 in the casing body 11 having the monitor board 94 (FIG. 3A) installed therein (FIG. 5A). More specifically, the procedure inserts the stacking reference members 40 through the opening 18 and installs the stacking reference members 40 such that part of the stationary guides 44 (i.e., a specific side where the unit cells 26 are mounted) and the movable guides 46 are located inside the casing body 11. The stacking reference members 40 are accordingly set to locate the upper faces 44u and 46u of the stacking reference members 40, on which the unit cells 46 are mounted, inside the casing body 11. In such setting, respective one ends 40e1 of the stacking reference members 40 are to be arranged close to the second wall member 12. The stacking reference members 40 are also arranged closer to the third wall member 15 than the specific section of the casing body 11 where the cell laminate 28 is located.

Figure 5B:
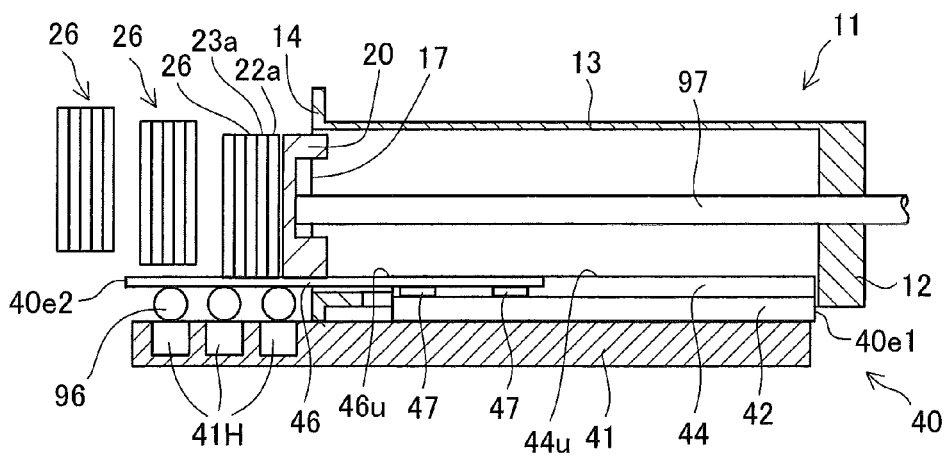

Referring to FIG. 5B, moving the movable guides 46 via the opening 17 causes respective other ends 40e2 of the stacking reference members 40 to be located outside the casing body 11. More specifically, the procedure arranges the stacking reference members 40 in the extended setting via the opening 17 such that the respective one ends 40e1 of the stacking reference members 40 are located inside the casing body 11, while the respective other ends 40e2 are located outside the casing body 11 (positioning step S20). The length of the stacking reference members 40 in the extended setting is determined according to the stacking number of the unit cells 26 and the compression degree of the cell laminate 28 under a preset load applied in the stacking direction.

Figure 5C:
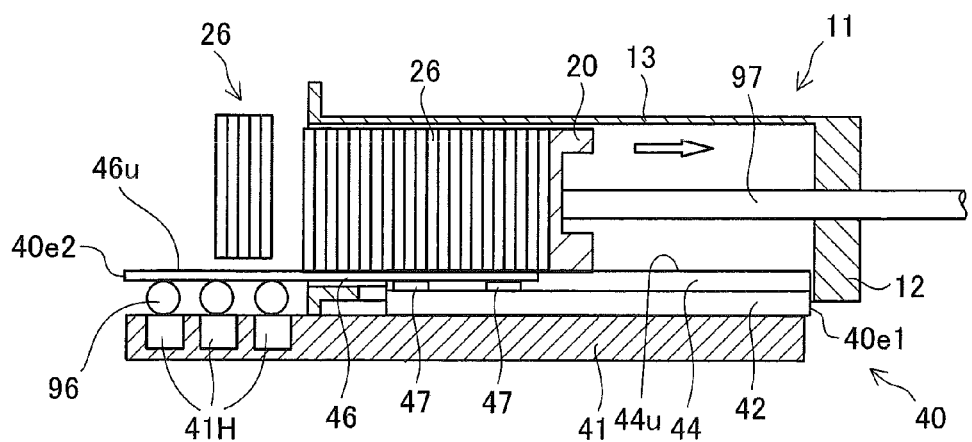

The procedure then sets the pressure plate 20 on the stacking reference members 40. More specifically, the procedure sequentially stacks or aligns a plurality of the unit cells 26 in a direction from inside to outside of the casing body 11 and mounts on the stacking reference members 40 as shown in FIGS. 5B and 5C. A rod-like cell retainer member 97 is inserted via a through hole (not shown) formed in the second wall member 12 to support and keep up the pressure plate 20. After setting the pressure plate 20 on the stacking reference members 40, the procedure mounts the insulator 22a, the terminal plate 23a, and the plurality of unit cells 26 onto the overhang(movable guides 46) of the stacking reference members 40 located outside the casing body 11. More specifically, the plurality of unit cells 26 are located on the stacking reference members 40, such that the cutouts 59p, 69p, and 89p formed in the mounting side P1 of the unit cells 26 (FIG. 2) are brought into contact with the stacking reference members 40. As shown in FIG. 5C, as the mounted unit cells 26 and the other relevant elements are pressed toward the second wall member 12, additional unit cells 26 are newly mounted on the stacking reference members 40 (cell stacking step S30).

The upper faces 44u of the stationary guides 44, on which the unit cells 26 are mounted, are aligned with the upper faces 46u of the movable guides 46, on which the unit cells 26 are mounted. The upper faces 44u of the stationary guides 44 and the upper faces 46u of the movable guides 46 are thus arranged in the same plane without any difference in level. When the mounted unit cells 26 are pressed toward the second wall member 12, such aligned arrangement enables the pressed unit cells 26 to be smoothly moved from the movable guides 46 onto the stationary guides 44. This arrangement effectively reduces the occurrence of potential troubles, such as misalignment of the unit cells 26 or damage of the unit cells 26, in the cell stacking step S30.

The method of manufacturing the fuel cell 1 is further described with reference to FIG. 6. FIG. 6 is a second explanatory diagram of the method of manufacturing the fuel cell 1. Referring to FIG. 6A, the procedure additionally mounts the terminal plate 23b and the insulator 22b on the stacking reference members 40, after mounting a preset number of the unit cells 26 on the stacking reference members 40. Referring to FIG. 6B, the procedure compresses the cell laminate 28 including the plurality of unit cells 26 in the stacking direction YR and contracts the stacking reference members 40 to locate the movable guides 46 of the stacking reference members 40 inside the casing body 11 (cell compressing step S40). More specifically, a pressure is applied to the stacking reference members 40 and the cell laminate 28 in a direction from outside of the casing body 11 (left side in FIG. 6B) toward the second wall member 12 via the end wall member 16 with the auxiliary machinery 38 mounted thereon. A pressurizing mechanism 55 as a component of the fuel cell manufacturing device 150 of the fuel cell is used for applying the pressure. The rollers 96 that are not required to support the stacking reference members 40 in this state are set in recesses 41h formed in the bottom plate 41.

As shown in FIG. 6C, the pressure is continuously applied until the cell laminate 28 is located inside the casing body 11 and the end wall member 16 comes into contact with the first wall member 14. After the end wall member 16 comes into contact with the first wall member 14, the procedure fastens the end wall member 16 to the first wall member 14 by means of the bolts 30, in order to maintain the load applied to the cell laminate 28 in the stacking direction YR (mounting step S50). The procedure then removes the stacking reference members 40 out of the casing body 11 via the opening 18. This step of removing the stacking reference members 40 out of the casing body 11 (removal step) may be performed between the cell compressing step S40 and the mounting step S50.

In the state where the stacking reference members 40 are not removable via the opening 17 due to the presence of the end wall member 16 and the cell laminate 28, the opening 18 formed in the casing body 11 enables the stacking reference members 40 to be removed out of the casing body 11. This arrangement preferably reduces the overall weight of the fuel cell 1, which is manufactured by using the stacking reference members 40.

The method of manufacturing the fuel cell 1 is further described with reference to FIG. 7. FIG. 7 is a third explanatory diagram of the method of manufacturing the fuel cell 1 or especially a reinforcing step S60. Referring to FIG. 7A, the procedure sets an attachment device 100 via the opening 18 onto an intermediate fuel cell 200 during manufacture having the end wall member 16 fastened to the first wall member 14. The attachment device 100 has a plurality of rollers 102 and a table 101, on which the plurality of rollers 102 are installed. Referring to FIG. 7B, the procedure uses these rollers 102 to insert the rod member 39, which is extended in the stacking direction, into the casing body 11 via a through hole formed in the second wall member 12. Referring to FIG. 7C, the procedure then fastens either end of the rod member 39 to the second wall member 12 and to the end wall member 16 by means of the nuts 31. The rod member 39 is located inside the groove H1 (FIG. 2) formed by aligning the cutouts 58, 68, and 88 of the cell laminate 28 with one another.

The rod member 39 extended over the stacking direction effectively enhances the strength of the casing 6. Application of the load onto either side of the cell laminate 28 via the end wall member 16 and the pressure plate 20 may deform the casing 6 having the opening 18. The arrangement of the rod member 39 (especially in the neighborhood of the opening 18) effectively reduces the decrease in strength of the casing 6.

The method of manufacturing the fuel cell 1 is further described with reference to FIG. 8. FIG. 8 is a fourth explanatory diagram of the method of manufacturing the fuel cell 1. As shown in FIGS. 8A and 8B, the procedure adjusts the compression degree of the cell laminate 28 in the intermediate fuel cell 200 after attachment of the rod member 39 in the stacking direction YR, in order to maintain the cell laminate 28 under an intended load (compression adjustment step S70). More specifically, referring to FIG. 8A, the procedure inserts an adjustment mechanism 120 as a component of the fuel cell manufacturing device 150 via a through hole (not shown) formed on the approximate center of the second wall member 12. The procedure presses the pressure plate 20 by means of the adjustment mechanism 120 toward the first wall member 14, so as to adjust the compression degree of the cell laminate 28. Referring to FIG. 8B, the procedure then inserts the eight screws 81 into eight threaded through holes formed in the second wall member 12 under a preset clamping load and restricts the motion of the pressure plate 20 via the second wall member 12. The compression adjustment step S70 accordingly adjusts the compression degree of the cell laminate 28 by moving at least one of the end unit cells 26 located on either end of the cell laminate 28 in the stacking direction YR. The compression adjustment step S70 of this embodiment moves the end unit cell 26 located on the side of the second wall member 12 (hereinafter referred to as "end cell 26e1") out of the two end unit cells 26 toward the first wall member 14, so as to adjust the compression degree of the cell laminate 28.

Referring to FIG. 8C, after setting a cable to connect the cell laminate 28 with the monitor board 94 via the opening 18, the procedure attaches the cover member 10 to the third wall member 15 by means of the bolts 30, so as to close the opening 18 (opening sealing step S80). In order to facilitate the attachment of the cover member 10, the intermediate fuel cell 200 after adjustment of the compression degree is rotated by 180 degrees and is kept at this position during the attachment of the cover member 10. The sequence of the reinforcing step S60 of mounting the rod member 39, the compression adjustment step S70 of adjusting the compression degree, and the opening sealing step S80 of attaching the cover member 10 is not restricted to the sequence of the embodiment described above but may be changed according to the requirements. The through hole formed on the approximate center of the second wall member 12 for insertion of the adjustment mechanism 120 may be closed with, for example, a metal plate member.

Figure 9:
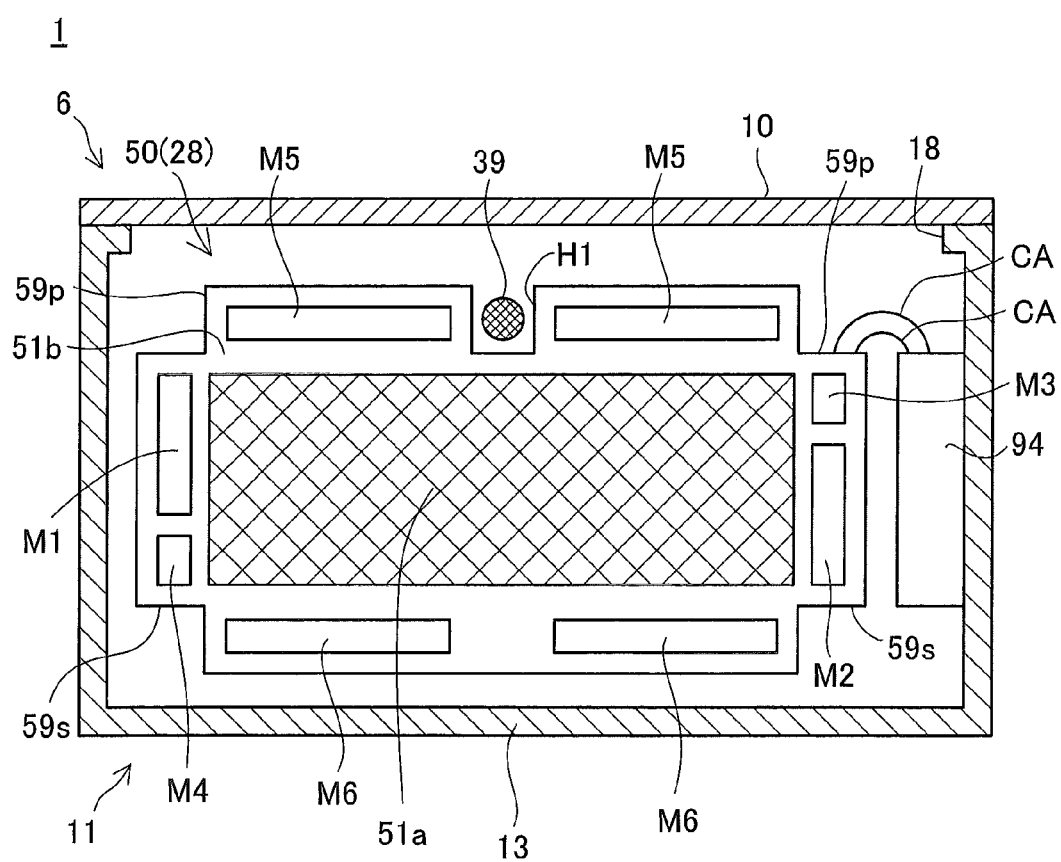
FIG. 9 is a sectional view taken along a line X-X in FIG. 1.

FIG. 9 is a sectional view taken along a line X-X in FIG. 1. In the fuel cell 1 manufactured through the steps described above with reference to FIGS. 5 to 9, the cell laminate 28 (the seal-integrated type membrane electrode assembly 50 is illustrated in the drawing) is maintained under a predetermined load and is contained inside the casing 6. The cell laminate 28 is electrically connected with the monitor board 94 via a cable CA.

As described above, the extendable stacking reference members 40 are used for manufacturing the fuel cell 1 of the embodiment (FIG. 3B). The unit cells 26 in the uncompressed state that are not fully receivable inside the casing body 11 are mounted on the extensions of the stacking reference members 40. This arrangement does not require a large casing having the sufficient dimensions to accommodate therein the overall cell laminate 28 in the uncompressed state, thus achieving size reduction of the overall fuel cell 1. Pressing the stacking reference members 40 and the cell laminate 28 by means of the end wall member 16 enables the stacking reference members 40 and the cell laminate 28 to be located inside the casing body 11 (FIGS. 6A and 6B). This arrangement does not require any separate member for directly pressing the stacking reference members 40 and the cell laminate 28, thus enabling the fuel cell 1 to be manufactured with high efficiency.

The stacking reference members 40 are attached to and detached out of the casing body 11 via the opening 18 (FIGS. 5A and 6C). Such attachment and detachment preferably improves the working efficiency in manufacturing of the fuel cell 1. More specifically, the stacking reference members 40 can be mounted in the casing body 11 more readily via the opening 18 formed in the third wall member 15, rather than via the opening 17 formed in the first wall member 14 (FIG. 1). Removal of the stacking reference members 40 out of the casing body 11 via the opening 18 (FIG. 6C) effectively reduces the overall weight of the fuel cell 1, compared with the overall weight of the fuel cell 1 without removal of the stacking reference members 40.

Attachment of the rod member 39 to the casing 6 preferably reduces the decrease in strength of the casing 6 having the opening 18. The rod member 39 is located inside the groove H1 arranged in the vicinity of the opening 18. The internal space of the casing 6 can thus be used effectively to contain the rod member 39. This arrangement achieves further size reduction of the fuel cell 1. The compression adjustment step S70 (FIGS. 8A and 8B) enables the load applied to the cell laminate 28 to be readily adjusted after fixation of the end wall member 16 to the first wall member 14. This arrangement assures application of an intended load onto the cell laminate 28 even when the respective unit cells 26 have a variation in property (for example, elastic modulus).

B. Second Embodiment

Figure 10:
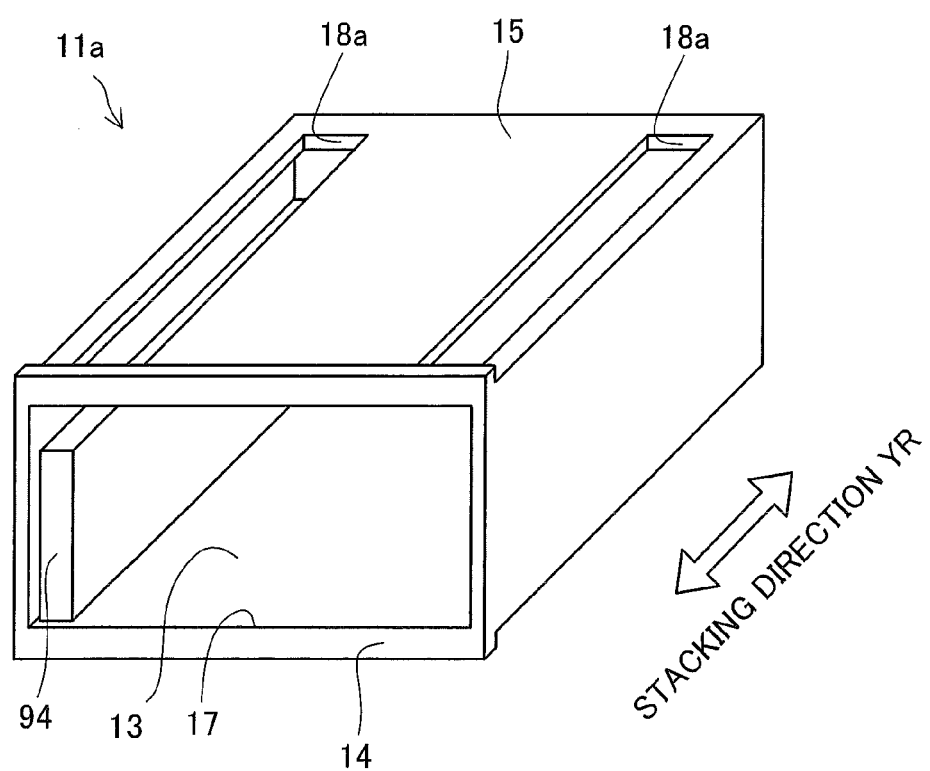
FIG. 10 is a diagrammatic representation of the appearance of a casing body 11a according to a second embodiment.
Figure 11:
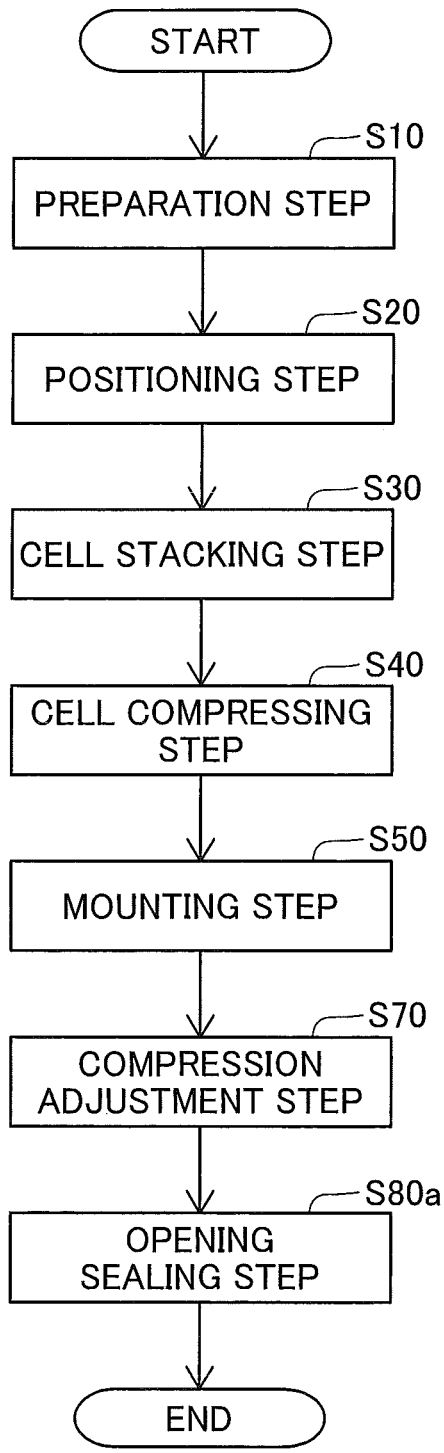
Figure 12:
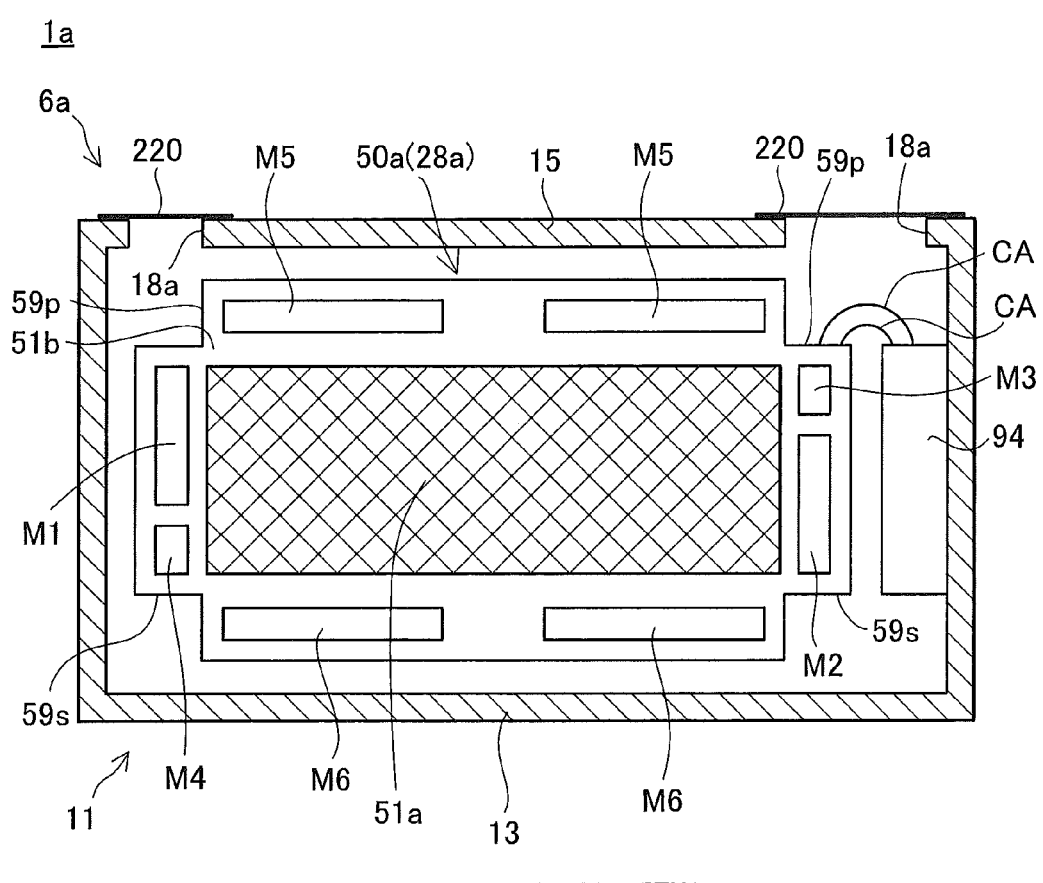
FIG. 12 is a sectional view of the fuel cell 1a of the second embodiment taken along an X-X corresponding line.

A fuel cell 1a according to a second embodiment is described below with reference to FIGS. 10 through 12. FIG. 10 is a diagrammatic representation of the appearance of a casing body 11a of the second embodiment. FIG. 11 is an explanatory diagram of a typical flow of a method of manufacturing the fuel cell 1a. FIG. 12 is a sectional view of the fuel cell 1a of the second embodiment taken along an X-X corresponding line. As shown in FIG. 10, the primary difference between the casing body 11a of the second embodiment and the casing body 11 of the first embodiment (FIG. 3A) is the shape of openings 18a formed in the third wall member 15. A cell laminate 28a of the second embodiment does not have the groove H1 as shown in FIG. 12. The rod member 39 is also excluded from the fuel cell 1a of the second embodiment. Otherwise the structure of the fuel cell 1a of the second embodiment is similar to the structure of the fuel cell 1 of the first embodiment. The like elements are expressed by the like numerals and symbols and are not specifically described here. The manufacturing method of the second embodiment shown in FIG. 11 excludes the reinforcing step S60, which is included in the manufacturing step of the first embodiment (FIG. 4), and has a different opening sealing step from that of the first embodiment. Otherwise the manufacturing method of the second embodiment is similar to the manufacturing method of the first embodiment. The like steps are expressed by the like step numbers and are not specifically described here.

Referring to FIG. 10, two long openings 18a extended in the stacking direction YR are formed in the third wall member 15 of the casing body 11a. The dimensions of the openings 18a are determined to allow for insertion of the stationary guides 44 and the movable guides 46 of the stacking reference members 40 (FIG. 3B).

An opening sealing step 80a of FIG. 11 is described with reference to FIG. 12. The opening sealing step 80a covers the openings 18a with water-impermeable but gas-permeable (e.g., hydrogen and the air) films 220. The films 220 may be composed of a porous material, for example, "POREFLON™" manufactured by Sumitomo Electric Fine Polymer, Inc.

The manufacturing method of the fuel cell 1a according to the second embodiment covers the openings 18a with the films 220, in order to prevent external invasion of any liquid, e.g., rainwater, but enable transmission of the gases, such as the fuel gas, passing through the inside of the cell laminate 28a. The smaller ratio of the openings 18a to the whole area of the third wall member 15 in the second embodiment than that of the first embodiment reduces the decrease in strength of a casing 6a. The decrease in strength of the casing 6a can thus be reduced without the reinforcing step S60. Like the structure of the first embodiment, the stacking reference members 40 are used to locate the cell laminate 28a inside the casing 6a. This arrangement achieves size reduction of the fuel cell 1a. The opening sealing step S80a using the films 220 may be replaced with the opening sealing step S80 of the first embodiment using the cover member 10.

C. Third Embodiment

Figure 13:
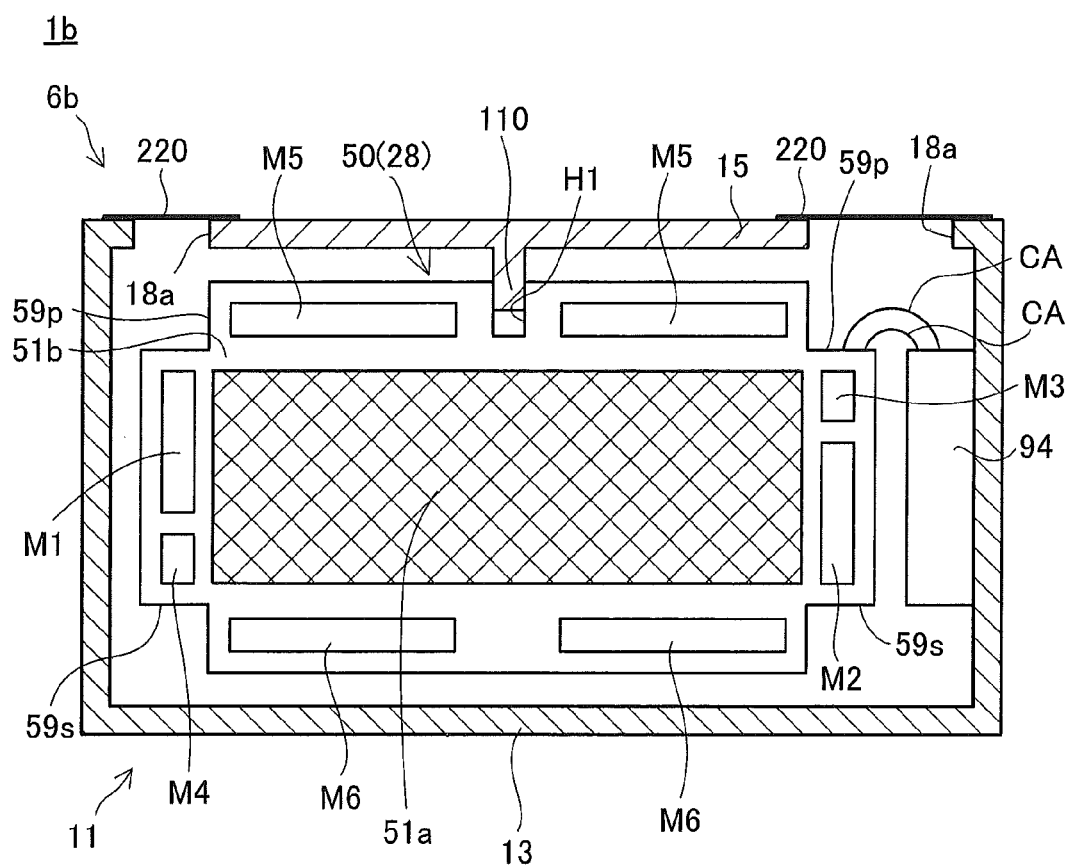
FIG. 13 is an explanatory diagram of a fuel cell 1b according to a third embodiment.

FIG. 13 is an explanatory diagram of a fuel cell 1b according to a third embodiment. FIG. 13 is a sectional view taken along an X-X corresponding line (FIG. 1). The primary difference from the second embodiment is that the third wall member 15 has a projection 110 and that the cell laminate 28 has a groove H1. Otherwise the structure of the fuel cell 1b of the third embodiment is similar to the structure of the fuel cell 1a of the second embodiment. The like elements are expressed by the like numerals and symbols and are not specifically described here. The manufacturing method of the fuel cell 1b has a different cell stacking step S30 from that of the second embodiment. Otherwise the manufacturing method of the third embodiment is similar to the manufacturing method of the second embodiment. The like steps are expressed by the like step numbers and are not specifically described here.

The projection 110 is protruded inward a casing 6b and is extended in the stacking direction YR. The cell stacking step of the third embodiment mounts a plurality of the unit cells 26 on the stacking reference members 40, such that the projection 110 is inserted and fit in the groove H1 as a first cutout.

The fuel cell 1b having the projection 110 inserted and fit in the groove H1 is manufactured by the manufacturing method of the fuel cell 1b according to the third embodiment. This arrangement effectively reduces the potential misalignment of the plurality of unit cells 26 by an impact on the fuel cell 1b made by, for example, a collision of a vehicle. Like the structure of the first embodiment, the stacking reference members 40 are used to locate the cell laminate 28 inside the casing 6b. This arrangement achieves size reduction of the fuel cell 1b.

D. Fourth Embodiment

Figure 14:
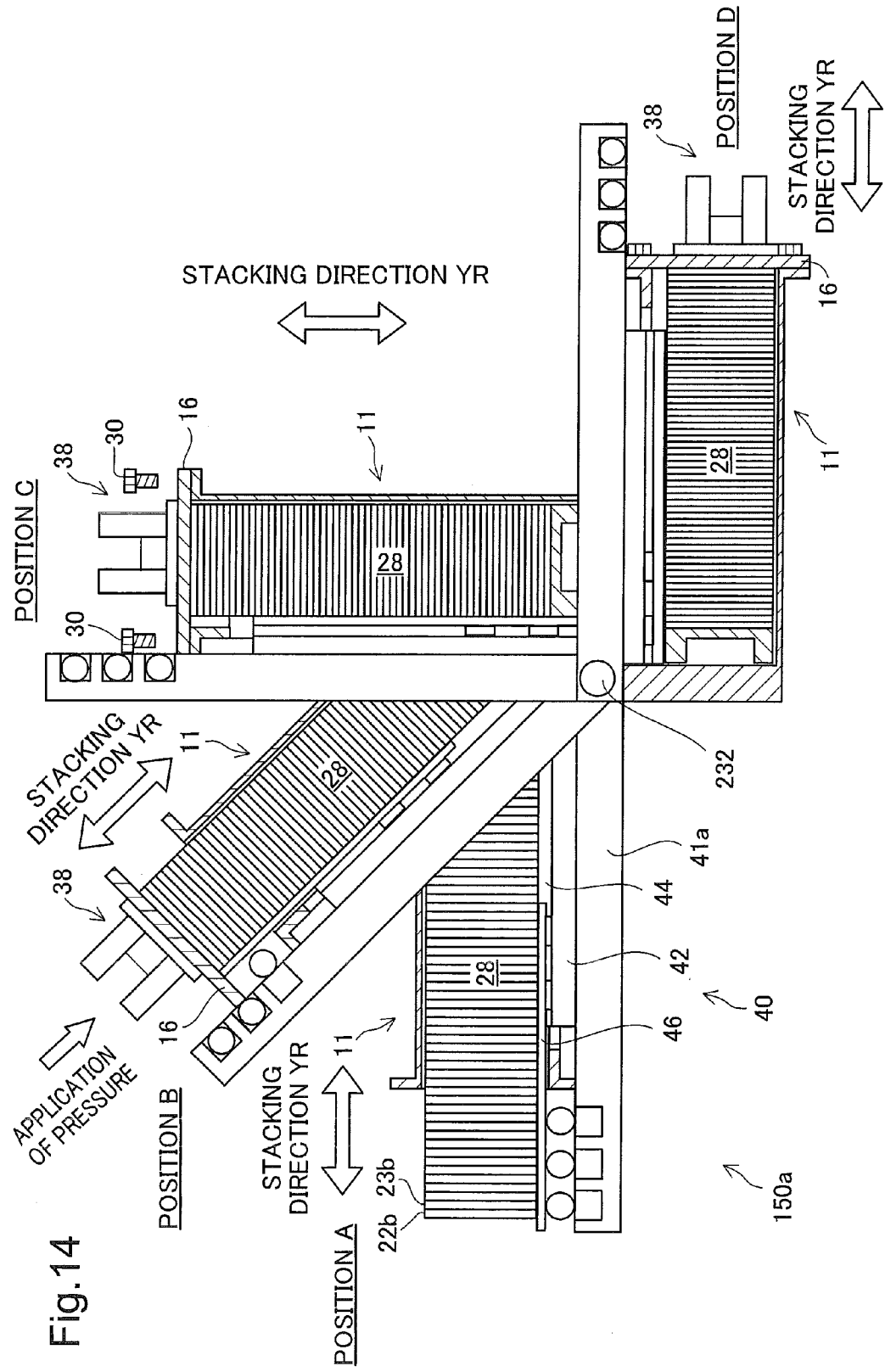
FIG. 14 is an explanatory diagram of a fuel cell manufacturing device 150a according to a fourth embodiment.

FIG. 14 is an explanatory diagram of a fuel cell manufacturing device 150a according to a fourth embodiment. The primary difference of the fuel cell manufacturing device 150a of the fourth embodiment from the fuel cell manufacturing device 150 of the first embodiment (FIG. 3B) is the presence of a rotating shaft 232. Otherwise the structure of the fuel cell manufacturing device 150a of the fourth embodiment (for example, the stacking reference members 40) is similar to the structure of the fuel cell manufacturing device 150 of the first embodiment. The like components are expressed by the like numerals and symbols and are not specifically described here. The structure of the fuel cell 1 manufactured by this fuel cell manufacturing device 150a is similar to the structure of the fuel cell 1 of the first embodiment. The like elements are expressed by the like numerals and symbols and are not specifically described here.

The fuel cell manufacturing device 150a of the fourth embodiment has the rotating shaft 232 serving as a rotating mechanism. The rotating shaft 232 is provided on a bottom plate 41a to displace the positions of the stacking reference members 40 and the casing body 11. More specifically, the stacking reference members 40 and the casing body 11 are rotated to change the stacking direction YR around the rotating shaft 232.

As described above, the fuel cell manufacturing device of the fuel cell 1 according to the fourth embodiment has the rotating shaft 232 to set the cell laminate 28 at various positions. In this application, for example, the cell stacking step S30 may be performed at a position A, the cell compressing step S40 may be performed at a position B, and the mounting step S50 may be performed at a position C. This application assures sufficient spaces for installation of the devices required at the respective steps (for example, the equipment used for mounting the unit cells 26 on the stacking reference members 40 and the pressurizing mechanism 55), thus improving the production efficiency of the fuel cell 1. Like the structures of the embodiments discussed above, the stacking reference members 40 are used for manufacturing the fuel cell 1. This arrangement achieves size reduction of the fuel cell 1.

E. Fifth Embodiment

Figure 15:
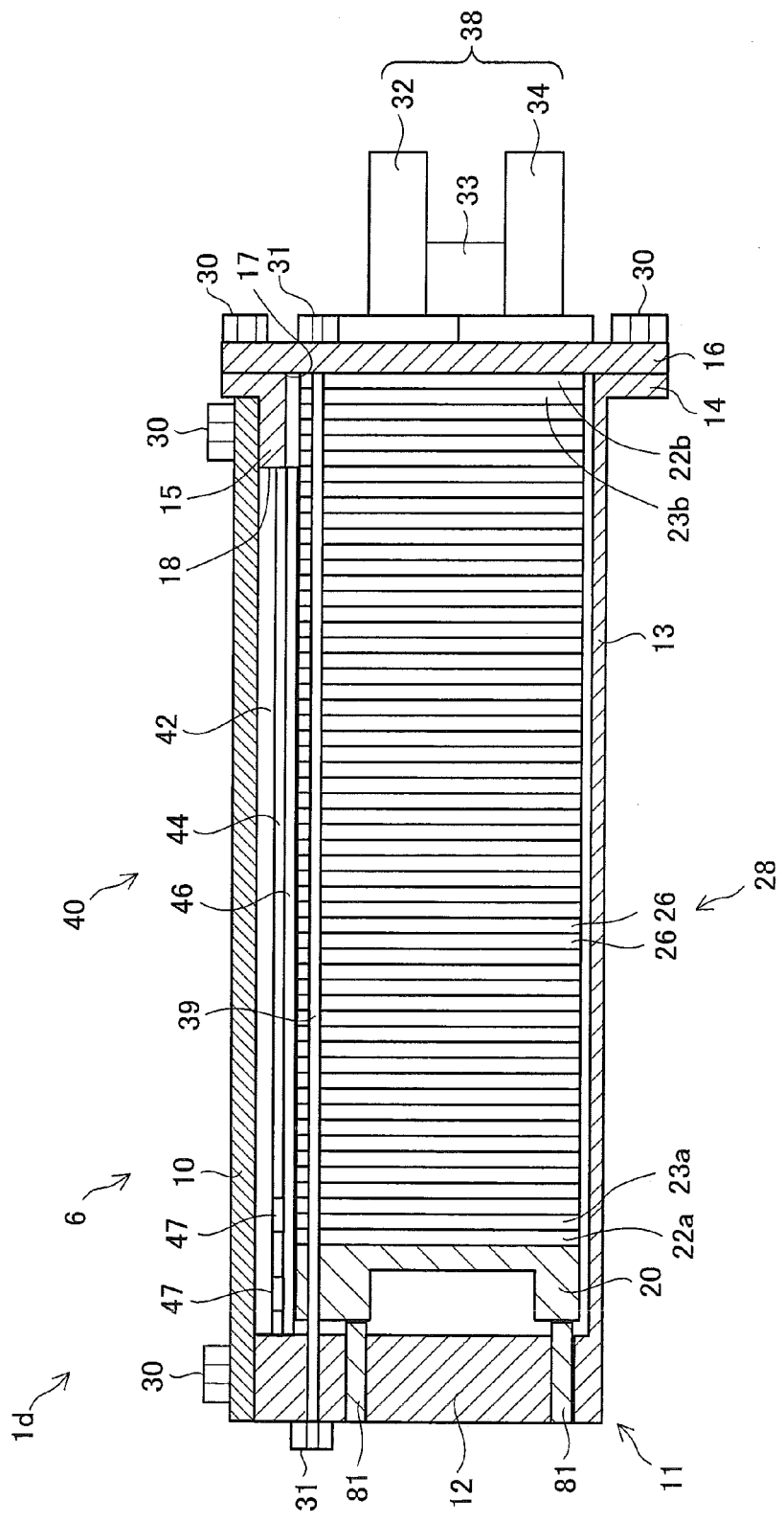
FIG. 15 is an explanatory diagram of a fuel cell 1d according to a fifth embodiment.

FIG. 15 is an explanatory diagram of a fuel cell 1d according to a fifth embodiment. Specifically, FIG. 15 shows a sectional view of the fuel cell 1d taken along a preset plane parallel to the sheet plane, like FIG. 1. The primary difference of the fuel cell 1d of the fifth embodiment from the fuel cell 1 of the first embodiment is that the stacking reference members 40 are located inside the casing 6. Otherwise the structure of the fuel cell 1d of the fifth embodiment is similar to the structure of the fuel cell 1 of the first embodiment. The like elements are expressed by the like numerals and symbols and are not specifically described here. The manufacturing method of the fuel cell 1d excludes the removal step of the stacking reference members 40 in the mounting step S50. Otherwise the manufacturing method of the fifth embodiment is similar to the manufacturing method of the first embodiment.

It is preferable to mount the stacking reference members 40 attached to the cover member 10 on the bottom plate 41. The fuel cell 1d is readily manufactured by detaching the stacking reference members 40 and the cover member 10 from the bottom plate 41 and attaching the cover member 10 to the third wall member 15.

As described above, during manufacture of the fuel cell 1d of the fifth embodiment, the unit cells 26 of the cell laminate 28 in the uncompressed state that are not fully receivable inside the casing 6 are mounted on the extendable stacking reference members 40. This arrangement does not require a large casing 6 having the sufficient dimensions to accommodate therein the overall cell laminate 28 in the uncompressed state, thus achieving size reduction of the overall fuel cell 1d.

F. Modifications

Among the various constituents and components included in the respective embodiments discussed above, those other than the constituents and components disclosed in independent claims are additional and supplementary elements and may be omitted according to the requirements. The invention is not limited to any of the embodiments and their applications discussed above but may be actualized in diversity of other embodiments and applications within the scope of the invention. Some examples of possible modification are given below.

F-1. Modification 1

The embodiments discussed above use the two stacking reference members 40 for manufacturing the fuel cells 1 through 1d. Alternatively only one stacking reference member 40 or three or a greater number of stacking reference members 40 may be used for manufacturing the fuel cells 1 through 1d. Using any number of the stacking reference members 40 achieves size reduction of the fuel cells 1 through 1d, like the embodiments discussed above.

F-2. Modification 2

In the embodiments discussed above, the compression adjustment step S70 (FIG. 8) uses the adjustment mechanism 120 to adjust the compression degree on the side of the second wall member 12. Alternatively the compression adjustment step S70 may adjust the compression degree on the side of the end wall member 16. One modified application may make through holes in the end wall member 16 and insert the screws 81 into the through holes to a certain dept in order to adjust the compression degree. In this modified application, the end unit cell 26 located on the side of the first wall member 14 out of the two end unit cells 26 is moved toward the second wall member 12, so as to adjust the compression degree. Another modified application may insert the screws 81 into through holes on both the side of the first wall member 14 and the second wall member 12 to adjust the compression degree. Only the screws 81 may be used as the adjustment mechanism 120 to adjust the compression degree of the cell laminate 28.

F-3. Modification 3

In the embodiments discussed above, the fuel cells 1 through 1*d* are polymer electrolyte fuel cells. The principle of the invention is also applicable to other various types of fuel cells including phosphoric acid fuel cells, molten carbonate fuel cells, and solid oxide fuel cells.

The invention claimed is:

1. A method of manufacturing a fuel cell comprising: a cell laminate obtained by stacking a plurality of cells, and a casing in which the cell laminate is contained in a compressed state in a stacking direction,
   wherein the casing includes a casing body having a first wall member that has a first opening and is arranged to intersect with the stacking direction and a second wall member that is arranged to face the first wall member, and an end wall member attached to the first wall member to close the first opening,
   the method of manufacturing the fuel cell comprising the steps of:
   (a) providing an extendable stacking reference member structured to extend and contract in the stacking direction;
   (b) arranging the stacking reference member in an extended setting via the first opening, such that one end of the stacking reference member is located inside the casing body and the other end of the stacking reference member is located outside the casing body;
   (c) after the step (b), mounting the plurality of cells of the cell laminate on the stacking reference member from inside to outside of the casing body;
   (d) contracting the stacking reference member and compressing the mounted cell laminate in the stacking direction, so as to locate the stacking reference member and the cell laminate inside the casing body; and
   (e) after the step (d), attaching the end wall member to the first wall member to close the first opening and maintaining the cell laminate under a load in the stacking direction.

2. The method of manufacturing the fuel cell in accordance with claim 1, wherein the casing body further includes a third wall member that is arranged to intersect with both the first wall member and the second wall member and has a second opening, and
   the step (b) includes locating the stacking reference member on a side of the third wall member,
   the method of manufacturing the fuel cell further comprising the step of:
   (f) after the step (d), removing the stacking reference member via the second opening out of the casing.

3. The method of manufacturing the fuel cell in accordance with claim 1, further comprising the step of:

(g) after the step (e), attaching a rod member, which is extended from the end wall member to the second wall member, to both the end wall member and the second wall member.

4. The method of manufacturing the fuel cell in accordance with claim 3, wherein the cell laminate has a first groove formed on a mounting side of the cell laminate, the mounting side being mounted directly on the stacking reference member, and
   the step (g) includes locating part of the rod member inside the first groove.

5. The method of manufacturing the fuel cell in accordance with claim 1, wherein the casing body further includes a projection that is protruded inward the casing and is extended in the stacking direction,
   the cell laminate has a first groove formed on a mounting side of the cell laminate, the mounting side being mounted directly on the stacking reference member, and
   the step (c) includes mounting the plurality of cells on the mounting reference member, such that the projection is located inside the first groove.

6. The method of manufacturing the fuel cell in accordance with claim 1, further comprising the step of:
   (h) after the step (e), moving at least one of end cells located on either end of the cell laminate in the stacking direction, in order to adjust a compression degree of the cell laminate.

7. The method of manufacturing the fuel cell in accordance with claim 1, wherein the step (d) applies a pressure onto the stacking reference member and the cell laminate via the end wall member in a direction from outside of the casing body toward the second wall member.

8. The method of manufacturing the fuel cell in accordance with claim 2, wherein the step (b) includes the steps of:
   (b1) locating the stacking reference member inside the casing body via the second opening; and
   (b2) after the step (b1), extending the stacking reference member to locate the other end of the stacking reference member outside the casing body.

9. The method of manufacturing the fuel cell in accordance with claim 2, wherein the step (f) includes, after removal of the stacking reference member, covering the second opening with a liquid-impermeable but gas-permeable film.

10. A fuel cell manufacturing device for a fuel cell comprising: a cell laminate obtained by stacking a plurality of cells, and a casing in which the cell laminate is contained in a compressed state in a stacking direction,
    the fuel cell manufacturing device comprising:
    an extendable stacking reference member structured to extend and contract in the stacking direction, wherein the cell laminate is mounted on the stacking reference member,
    wherein the stacking reference member has a length in a contracted setting that is shorter than a stacking length which is an internal length of the casing in the stacking direction, while having a length in an extended setting that is longer than the stacking length.

11. The fuel cell manufacturing device in accordance with claim 10, further comprising:
    an adjustment mechanism configured to move in the stacking direction at least one of end cells located on either end of the cell laminate contained inside the casing, in order to adjust a compression degree of the cell laminate.

12. The fuel cell manufacturing device in accordance with claim 10, wherein the stacking reference member includes:

a first reference member located inside the casing and structured to extend and contract in the stacking direction; and a second reference member arranged to be movable in the stacking direction relative to the first reference member and thereby to be partially located outside of the casing.

13. The fuel cell manufacturing device in accordance with claim 10, wherein the stacking reference member has a mounting face arranged in one identical plane, wherein the cell laminate is mounted on the mounting face.

14. A fuel cell, comprising:

a cell laminate obtained by stacking a plurality of cells one upon another;

a casing in which the cell laminate is contained in a compressed state in a stacking direction; and an extendable stacking reference member structured to extend and contract in the stacking direction of the cell laminate and arranged to be located inside the casing in a contracted setting, wherein the stacking reference member in an extended setting has one end located inside the casing and the other end located outside the casing, and the cell laminate to be contained in the casing is mounted on the stacking reference member, and wherein the stacking reference member has a length in the extended setting that is longer than an internal length of the casing in the stacking direction.

\* \* \* \* \*